L. Stewart,
Steam Plow.
No. 91,383. Patented June 15, 1869.
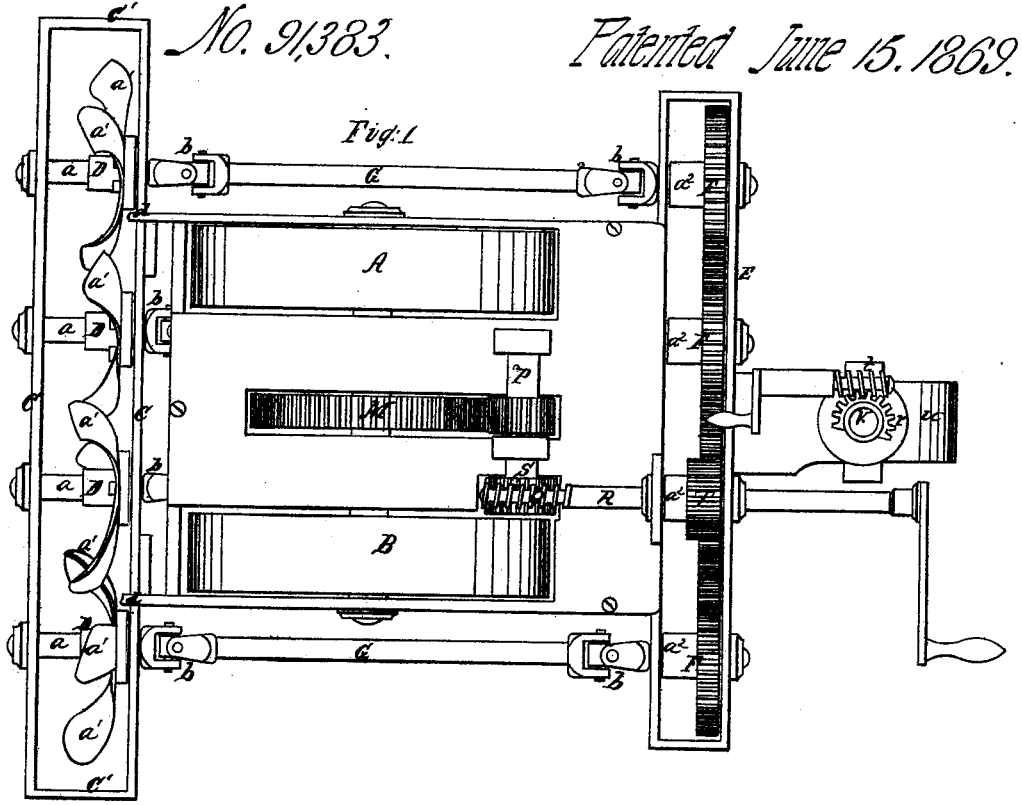
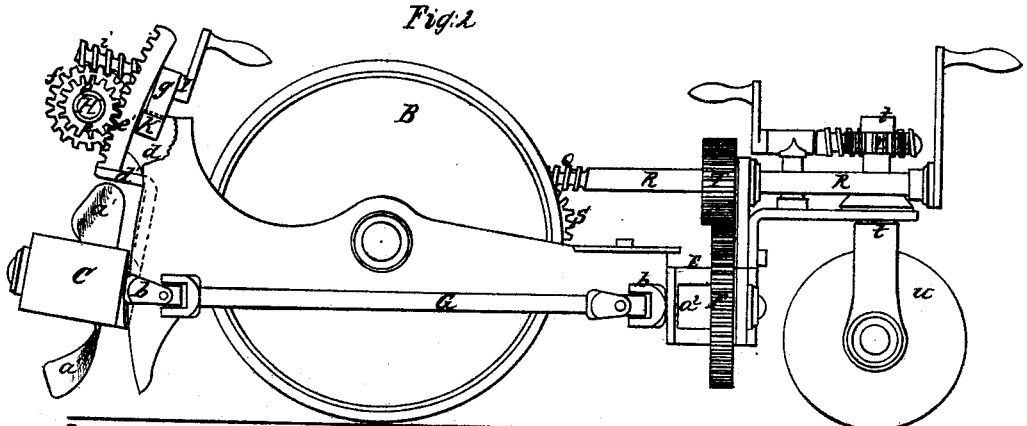

UNITED STATES PATENT OFFICE.

LINUS STEWART, OF SAN FRANCISCO, CALIFORNIA.

IMPROVEMENT IN STEAM-PLOWS.

Specification forming part of Letters Patent No. 91,383, dated June 15, 1869.

*To all whom it may concern:*

Be it known that I, LINUS STEWART, of the city and county of San Francisco, State of California, have invented an Improved Steam Plow and Cultivator; and I do hereby declare the following description and accompanying drawings are sufficient to enable any person skilled in the art or science to which it most nearly appertains to make and use my said invention or improvement without further invention or experiment.

My invention relates to improvements in steam or locomotive plows and cultivators for turning and pulverizing the soil and preparing it for the different purposes of agriculture.

In this plow the soil is cut and turned by plow-shaped cutters or arms arranged around a central hub. These revolving plows are carried at the rear of the machine upon horizontal shafts, inside of a supplementary frame, and are operated by gearing connected with the engine, which is carried upon the frame of the plow. These plows or cutters cut the soil transversely to the travel of the plow. The supplementary frame, inside of which the cutters revolve, is raised and lowered by a novel contrivance, by which the plows can almost instantly be raised out of the ground when necessary, in order to avoid any obstruction which may be in the way. The horizontal shafts, which transmit the motion to the cutters, extend almost the entire length of the machine, and are made in sections and connected together by universal joints, so that they will accommodate themselves to any elevation or depression of the cutters. The cutters are operated by gearing connected with the same shaft as that which gives motion to the driving-wheels of the plow.

To more fully illustrate and explain my invention, reference is had to the accompanying drawings, forming part of this specification, in which—

Figure 1 is a plan. Fig. 2 is a side view.

Similar letters of reference in each of the figures indicate like parts.

A and B are two broad wheels, placed inside of a suitable and convenient frame, upon which the engine which is to furnish the necessary power for propelling the machine and operating the plows or cutters is placed.

The supplementary frame in which the cutters revolve consists of the two sides C C, with the ends $C'$ $C'$. The shafts $a$ $a$, which carry the plows, bear in the sides C C and extend only a short distance outside of the frame. The hubs D are secured to these shafts, and have the cutters or arms $a'$ $a'$ $a'$ radiating from them in such a manner that when revolving will intersect each other. These arms or cutters are curved into the form or shape of the mold-board of a common plow, so that they will lift the soil after it has been cut, and then, by its peculiar shape, completely turn it over into the furrow from which it was taken, the after action of the cutters thoroughly pulverizing it.

At the front of the plow-frame is a similar frame, E, in which the cutters revolve, inside of which are placed four gear-wheels, F, corresponding to the four revolving cutters on the rear frame. These wheels gear into each other, and are carried by the shafts $a^2$ $a^2$ $a^2$, similar to those which carry the plows or cutters.

The shafts $a$ $a$ $a$ of the cutters are connected with the shafts $a^2$ $a^2$ $a^2$ of the gear-wheels by horizontal connecting-shafts G G G G by means of universal joints $b$ $b$ at each end, thus allowing the shafts $a$ $a$ $a$, upon which the cutters revolve, to always remain horizontal, notwithstanding the frame on which they bear is raised or lowered to any point necessary.

At the rear of the plow-frame, and upon each side, is an arm, $d$, projecting out over the supplementary frame which carries the cutters. Bearing in the ends of these arms is a horizontal shaft, H, above the supplementary frame, carrying at each end the pinions $e$ $e$ and in the middle the pinion $f$. Attached to the inner side, C, of the supplementary frame are two standards, $d'$ $d'$, the upper ends of which are bent outward at right angles, and to which is attached vertically the segmental racks $e'$ $e'$. These racks are engaged by the teeth on the pinions $e$ $e$ at each end of the shaft H.

A short shaft, I, bearing in a projection, $g$, on the horizontal bar K, has its end formed into an endless screw, $i$, which engages with the teeth on the middle pinion, $f$. The shaft I is operated by means of a crank at the opposite end, by turning which the supplementary frame is raised or lowered, as desired.

Motion is communicated to the wheels A and B through the gear M upon the axle, this gear being turned by a pinion on the shaft P; but, if preferred, for the sake of economizing space or other reason, the wheel M may be dispensed with and the shaft P extended so as to carry pinions, one on each end, acting upon teeth formed on the inner side of the flanges of the wheels A and B.

Motion is communicated to the shaft P by an endless screw, Q, at the end of the shaft R, operating in the toothed wheel S. The shaft R also carries the pinion T, which engages with one of the gear-wheels F, which operates the cutters at the rear of the plow, causing them to rotate in opposite directions, the arms $a'$ $a'$ $a'$ intersecting each other. The shaft R is driven by a belt from the engine, which, by the above-described means, at the same time operates the cutters and gives traction to the plow.

The front or steering wheel, U, is broad enough to pass over the ground without cutting deeply into it, and has a vertical standard, V. The upper end of this standard is provided with a pinion, $r$, and an endless screw, $t$, operated by a crank, causes the wheel to turn in any desired direction, and thus give direction to the plow.

The present form of cutters—i. e., plow-shaped—will thoroughly perform the work of turning and pulverizing the soil. Their points are curved outward at the same time that the form of a mold-board is given to them, so that the soil, after being cut, will be lifted a certain distance before it is dropped back into the furrow. The cutters are all placed in a line and cut from each other. Each arm can be made separate and bolted to the central hub, in which case, should one of them be broken, it can easily be removed and replaced with another.

In case any obstruction should be in the way of the cutters the entire frame in which they revolve is easily elevated to a sufficient height to allow them to pass over it, after which they can be as easily lowered again into the ground, and that without throwing any portion of the machinery out of gear.

The entire machinery is operated from one shaft, thus giving a uniformity to the movement of the several parts, which cannot become deranged unless some part should be broken.

Having thus described my invention, what I claim, and desire to secure by Letters Patent, is—

1. The arrangement of the revolving cutters within a supplementary frame, all in the same line, at right angles to the line of travel, and so placed that the curves described by the arms or blades $a'$ $a'$ may intersect each other, substantially as described.

2. The horizontal connecting-shaft G, united to the shafts $a$ and $a^2$ by universal joints $b$ $b$, substantially as and for the purpose described.

3. The segmental racks $e'$ $e'$, attached to the supplementary frame and engaging with the pinions $e$ $e$ on the shaft H, said shaft being operated by an endless screw, $i$, engaging with a pinion, $f$, on the shaft H, substantially as and for the purpose described.

In witness whereof I have hereunto set my hand and seal.

L. STEWART. [L. S.]

Witnesses:
WILLIAM STANIFORTH,
GEO. H. STRONG.